United States Patent

[11] 3,629,569

| [72] | Inventor | John Gillis Johnsson<br>Oxelosund, Sweden |
|---|---|---|
| [21] | Appl. No. | 811,721 |
| [22] | Filed | Apr. 1, 1969 |
| [45] | Patented | Dec. 21, 1971 |
| [73] | Assignee | Sunne Gummifabrik AB<br>Sunne, Sweden |

[54] VEHICLE LAMP HOUSING
4 Claims, 3 Drawing Figs.

[52] U.S. Cl...................................................... 240/7.1,
240/8.2, 340/119
[51] Int. Cl...................................................... B60q 1/00
[50] Field of Search...........................................240/7.1, 7.1
C, 8.18, 8.2, 8.3, 25, 41.55, 41 B, 41.1, 52, 54, 57,
73 BA, 73 BJ, 51.11, 78 F, 51.11 A, 52 BL;
340/90, 101, 104, 115, 119, 144

[56] References Cited
UNITED STATES PATENTS

| 1,707,003 | 3/1929 | Geyser | 240/7.1 X |
|---|---|---|---|
| 1,977,356 | 10/1934 | Schmid | 240/8.18 X |
| 2,099,444 | 11/1937 | Langdon | 240/7.1 |
| 2,511,971 | 6/1950 | Dalton | 340/98 |
| 3,154,252 | 10/1964 | Baake | 240/8.18 X |
| 3,226,678 | 12/1965 | Dekko et al. | 340/119 |
| 3,322,944 | 5/1967 | Mellyn | 240/8.18 |

FOREIGN PATENTS

| 1,059,737 | 11/1953 | France | 240/2.1 |
|---|---|---|---|

*Primary Examiner*—Louis J. Capozi
*Attorney*—Cushman, Darby & Cushman

ABSTRACT: A housing for a vehicle indicator lamp comprises a rubber body forming an attachment base, an elongated arm and a head at the end thereof. The head is shaped as a short sleeve, and opposite ends thereof are closed by rigid transparent covers which are inserted with their circular edges into grooves in the elastic head, thereby stiffening the same. A tubular electric bulb extends across the cavity of the head, and its end caps are inserted into recesses in the rubber walls thereof. Only when the covers have been taken out, the rubber head can be deformed enough to disengage the bulb caps from said recesses.

PATENTED DEC 21 1971 3,629,569
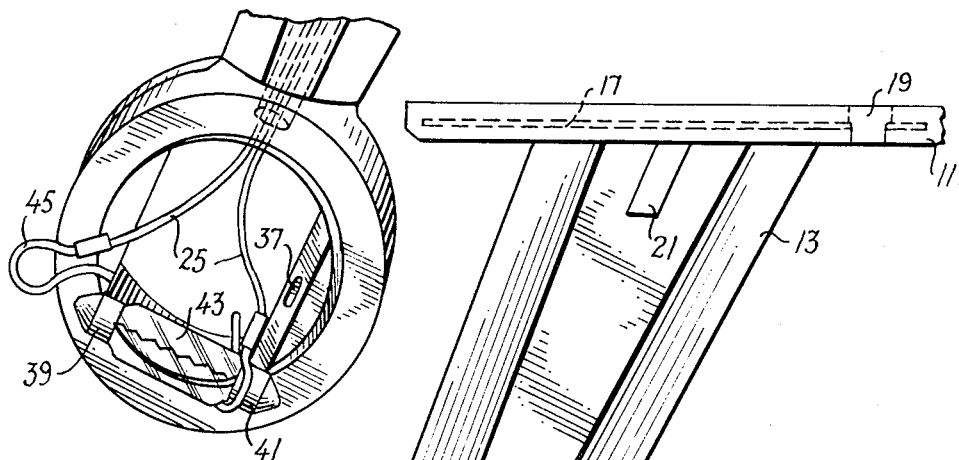
Fig.2
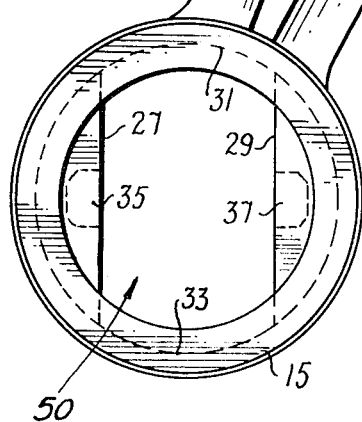
Fig.1
Fig.3
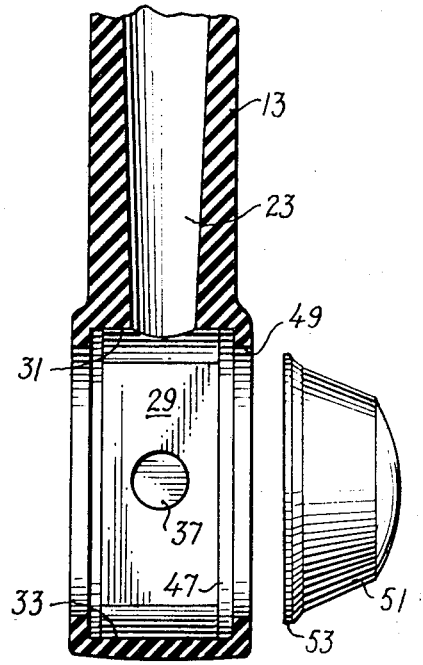
INVENTOR
John Gillis Johnsson
BY Cushman, Darby & Cushman
ATTORNEYS

VEHICLE LAMP HOUSING

This invention relates to a vehicle lamp, for example for a vehicle direction indicator. In order to be seen from as many angles as possible, such lamps should project from the vehicle. However, as a result they get damaged easily.

The object of the invention is to provide such a lamp which can undergo collision with other vehicles or fixed obstacles without the risk of the electric bulb being damaged or displaced.

The invention accordingly provides a housing for a vehicle lamp, comprising a body formed integrally of resilient material and defining a base for attachment to the vehicle, an arm extending from said base and an aperture extending transversely through said arm at the free end thereof, the internal periphery of said aperture having two oppositely disposed recesses for receiving the end caps of a tubular electric bulb.

The invention is illustrated by way of example in the accompanying drawing, in which:

FIG. 1 is an elevation of a lamp housing according to the invention.

FIG. 2 is perspective view of a part of the lamp as seen when a bulb is being mounted therein, and FIG. 3 is a cross-sectional view of the same part, taken at right angles to FIG. 1, showing a protective shield disassembled therefrom.

Referring to the drawing, a vehicle lamp comprises a rubber body consisting of three integrally moulded parts, namely a platelike base 11, a longitudinal arm 13 extending therefrom, and a head part 15 carried by said arm. A sheet metal plate 17 is moulded into and reinforces the rubber base 11 and comprises mounting screw holes 19. The cross section of the arm 13 is of flattened hexagonal shape and its cross-sectional area decreases towards part 15 to make the same increasingly flexible. The numeral 21 designates a reinforcing rubber web. The arm 13 has a central cavity 23 extending throughout its length, in which electric current supply conductors 25 are disposed. At its free end the arm 13 merges into the widened head part 15 having the shape of a circular rim or short cylindric sleeve. The central plane thereof coincides with the central plane of the arm 13, and head part 15 is somewhat thicker than the arm 13 (see FIG. 3). The diameter of the head part 15 is greater, e.g. about three times greater than the width of the adjacent portion of the arm 13, and the arm extends substantially radially from the cylindrical face of the head. Thus the head forms a rounded and thickened free end of the one-piece rubber body.

An aperture 50 extends transversely to the arm 13 between the opposite flat faces 27 and 29 of the head 15, the internal periphery of said aperture comprising two opposite, parallel, flat faces 27, 29 and two intermediate, cylindrically curved faces 31, 33. The latter are of a slightly smaller diameter than the outer diameter of the head 15, the material bounding said faces 31, 33 having a thickness of only a few millimeters. It is thus easy to compress said faces towards one another by manually squeezing the head 15. The material bounding the flat faces 27, 29 is thicker, and recesses 35, 37 are formed therein. These recesses, which may be cylindrical and/or conical, have a shape corresponding to that of metallic end caps 39, 41 (FIG. 2) of a tubular electric bulb 43 which may be of any common type suitable for use in vehicle lamps. The distance between the faces 27, 29 and the oppositely disposed recesses 35, 37 therein is so chosen that the end caps of the bulb project sufficiently far into said recesses that the bulb is securely held therein against displacement when the head 15 is its normal fully circular shape. In order to remove the bulb when burnt out and to substitute a new one, one has to flatten the head enough to free one end cap of the bulb from its recess. Before the new bulb is inserted into its above-mentioned position, the same is electrically connected to the wires 25 by means of spring clamps 45 which are pushed endwise upon the bulb caps, as shown in FIG. 2. As said clamps do not support the bulb, and as the wires are weak and pliable they maintain a durable and reliable electrical contact that is hardly affected by the vibrations of the vehicle.

The width of the flat faces, 27, 29 in the axial direction is less than that of the curved faces 31, 33 and on either side of the faces 27, 29 there is a groove 47 the base of which is concentric and flush with the cylindrical faces 31, 33. On the outer side of the groove the head has an inwardly directed annular flange or lip 49 which surrounds a circular window opening. The circular edge 53 of a cup-shaped protective glass or shield 51, which has a greater diameter than the window opening and preferably is of about the same diameter as that of the groove 47, can be inserted into the said window opening. The protective shield 51 is made of a rigid and shock-resistant material, such as polymethyl methacrylate, in order to be able to withstand collision stresses. It may be transparent or translucent and either clear or colored. Usually the shield facing forwards is made of translucent white material and the shield facing to the rear is of translucent red material.

When mounting the protective shields, the lip 49 and adjacent head parts must be deformed in order to allow the insertion of the edge 53 into the groove 47. When the head 15 then resumes its original shape, the protective shield is firmly retained by the lip 47 and the joint is tightly sealed. When the two shields are in place, the resilient head 15 is so stiffened or reinforced that shocks or contacts caused by traffic incidents cannot deform it sufficiently to dislodge the bulb, and the latter is supported and retained in its proper position without detriment to its electric connection. The rubber material surrounding the bulb caps is, however, sufficiently yielding to suppress or reduce the vibrations and shocks before they reach the filament of the bulb. The thickness of the material of the arm 13 and the elasticity of the rubber are so selected as to allow the bending of the arm 13 through an angle of 90° or more in any direction. During normal usage of a vehicle the resilience of the arm 13 also absorbs road shocks and vibrations.

The lamp described above is particularly suited for use as a warning indicator for mounting upon bumpers and platforms of lorries and trailers to indicate the outermost parts thereof.

I claim:

1. A housing for a tubular electrical vehicle lamp, comprising a body formed integrally of resilient material and defining a base for attachment to the vehicle, an arm having a hollow interior bore for receiving electrical conductors and extending from said base and terminating in an enlarged head portion formed with a transverse opening therethrough at the end of said arm opposite said base, the internal surfaces bounding said opening having two opposite disposed recesses therein for receiving the end caps of a tubular lamp.

2. A housing as claimed in claim 1, wherein the arrangement of said recesses is such that deformation of said surfaces bounding said aperture is required to enable insertion of the ends of a bulb in said recesses, and wherein said head portion further has an opposing annular groove located in said head portion about each said opening for each receiving a rigid light transmitting cover.

3. A housing as claimed in claim 1 wherein head portion containing said aperture is of generally cylindrical shape, said surfaces bounding said aperture being partially of correspondingly cylindrical shape and having two opposite flat faces defining two thicker flat-sided wall portions and two thinner cylindrical wall portions, the said recesses being disposed in the thicker wall portions.

4. A lamp for indicating vehicle position, or driving direction, comprising an integral body of resilient material, having a platelike base for attachment to a vehicle, an intermediate elongated flexible neck part and a bulb-holding head part, said head part including a sleeve having an inner surface circumferentially bounding an aperture extending through said head part and opening in opposite directions at right angles to the longitudinal direction of said neck part, the inner surface of said sleeve having two recesses located symmetrically on opposite sides of said aperture and adapted for receiving end caps of a tubular electric bulb, each opening of said aperture being covered by a rigid light-transmitting shield having its circular edge inserted into a corresponding groove in said head part, thereby stiffening the same and preventing such deformation thereof as is necessary for disengagement of the bulb.

* * * * *